United States Patent [19]
Takeda

[11] 3,939,492
[45] Feb. 17, 1976

[54] LOCKING MECHANISM FOR CONTROL LEVER IN MAGNETIC TAPE RECORDER
[75] Inventor: Tekeshi Takeda, Iwaki, Japan
[73] Assignee: Alps Motorola Inc., Tokyo, Japan
[22] Filed: Dec. 18, 1974
[21] Appl. No.: 533,808

[30] Foreign Application Priority Data
Feb. 16, 1974 Japan.............................. 49-18948

[52] U.S. Cl. ...................... 360/61; 360/93; 360/96
[51] Int. Cl.² ......................................... G11B 15/02
[58] Field of Search ............ 360/61, 62, 63, 64, 93, 360/96, 137

[56] References Cited
UNITED STATES PATENTS
3,762,721 10/1973 Corso.................................... 360/93
3,818,504 6/1974 Schroeder............................. 360/96

Primary Examiner—James W. Moffitt
Attorney, Agent, or Firm—James W. Gillman; Donald J. Lisa

[57] ABSTRACT

A locking mechanism for a record/reproduce control lever of a magnetic tape recorder/reproducer slidably mounted alongside the outside of the cartridge receiving chamber of the recorder/reproducer includes a movable lever pivotally mounted on the recorder/reproducer chassis and spring-biased to extend through an opening in the chassis side wall for engagement by a cartridge inserted into the cartridge receiving chamber. First and second holes are placed in the control lever and are aligned opposite an extension on the movable lever when the control lever is moved to its first and second positions, respectively. When a cartridge is inserted into the cartridge receiving chamber to deflect and rotate the movable lever away from the opening, the extension engages the hole in the control lever which is aligned with it. This causes the control lever to be locked into position and prevented from movement so long as the cartridge is in the chamber. Removal of the cartridge from the cartridge receiving chamber, permits a spring to force the pivoted movable out of engagement with the control lever thereby enabling it to be moved to either its reproduced (first) and record (second) position.

5 Claims, 14 Drawing Figures

LOCKING MECHANISM FOR CONTROL LEVER IN MAGNETIC TAPE RECORDER

BACKGROUND OF THE INVENTION

This invention relates generally to magnetic tape recorders, and more particularly to a locking mechanism for a function control lever used to transfer the operation of the tape recorder between recording and reproducing modes of operation.

Heretofore, magnetic tape cartridge recorder/reproducer devices have not been provided, a locking mechanism for locking the control lever in place when a cartridge is in the device. Thus, if the record/reproduce function control lever is accidentally moved during the reproducing operation, a part of record on the magnetic tape in the cartridge can be erased; so that the entire tape is made useless. It is desirable to lock the function control lever in place whenever a cartridge is in the device to prevent such accidental erasure from occurring.

It is an object of the present invention to provide a locking mechanism for the record/reproduce function control lever in a magentic tape recorder/reproducer.

It is another object of the present invention to provide a locking mechanism for a function control lever in a magnetic tape recorder/reproducer which is simple in construction and economical to manufacture.

SUMMARY OF THE INVENTION

In accordance with a preferred embodiment of the invention, the locking mechanism for a function control lever used in a magnetic tape recording/reproducing apparatus is slidably mounted on the side of the cartridge receiving chamber. The function control lever can be moved to at least a first reproducing position and a second recording position. The locking mechanism includes a movable lever which is pivotally mounted on the chassis of the recording/reproducing apparatus adjacent the cartridge receiving chamber. This pivoted lever is spring-biased between a first position, where a cartridge engaging roller is positioned inside the cartridge receiving chamber, and a second position, where the cartridge engaging roller engages the cartridge to rotate the lever substantially out of the cartridge receiving chamber.

First and second holes are provided in the function control lever and are located to be aligned with a projection on the pivotally mounted lever; so that when the lever is pivoted into its second position, a projection on it extends through whichever one of the holes is aligned with it. This then prevents further movement of the function control lever to its other position so long as a cartridge remains in the cartridge receiving chamber. When the cartridge is removed from the chamber, the pivoted lever is spring-biased to its first position which withdraws the extension carried by it from the hole to permit movement of the function control lever to either one of its positions as desired.

DETAILED DESCRIPTION

Figure 1A:
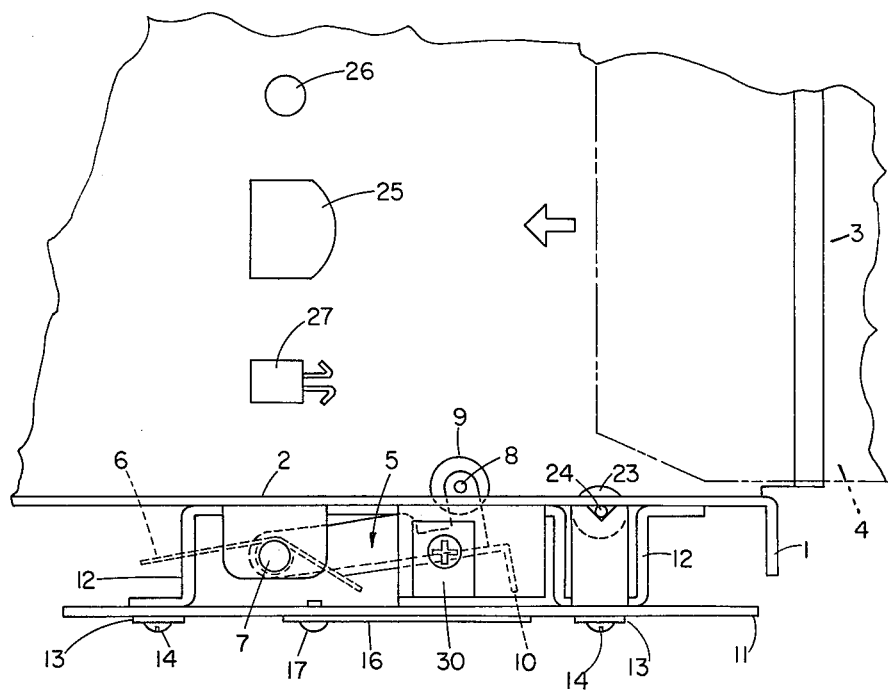
FIGS. 1(a) and 1(b) are a plan view and an elevational view, respectively, of a preferred embodiment of the invention showing the relative location of the parts before a cartridge is inserted.
Figure 1B:
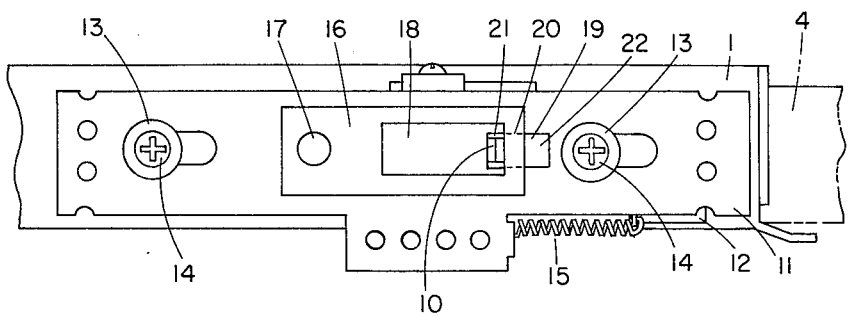

Referring now to the drawings, wherein like reference numerals have been used throughout the several figures to designate the same or similar components, FIGS. 1(a) and 1(b) show a plan view and an elevational view of a portion of a magnetic tape recorder/reproducer. A chassis 1 is provided with a side wall 2 and an opening 3 defining a cartridge receiving chamber along with another side wall (not shown) located on the chassis 1 opposite the side wall 2. A cartridge 4 is inserted into the cartridge receiving chamber in the direction marked by the arrow.

A movable member or lever 5 has one end pivotally secured to the chassis 1 by a pin 7. The other end or free end of the member 5 is urged by a cantilever spring 6 to project through an opening in the side wall 2 into the cartridge receiving chamber. A roller 9 is mounted on the free end of the member 5 by a pin 8, and a projecting extension 10 is provided on the opposite side of the free end.

A function control lever 11 for controlling the recording and reproducing operations of the magnetic tape recorder is slidably mounted on brackets 12 attached to the side wall 2 by means of concave washers 13 and screws 14. The function control lever 11 is urged toward the right (as viewed in FIG. 1) by a coil spring 15 provided between a part thereof and the bracket 12 toward a first or reproducing position as shown in FIGS. 1(a) and 1(b). When the function control lever 11 is depressed leftwardly as viewed in the same drawing (figure), it is moved to its second or recording position.

A flat resilient spring lever 16 has one end secured by a rivet 17 to the side of the control lever 11 opposite the side wall 2 and the other end of the spring lever 16 is left free. The resilient spring lever 16 has a comparatively wide rectangular hole 18 in it, so that an edge 20 overlaps a smaller rectangular hole 19 formed through the control lever 11. This divides the hole 19 into two parts 21 and 22.

A guide roller 23 for guiding the cartridge is rotatably attached to the bracket 12 by a pin 24. A magnetic head 25, a pinch roller 26, a contact switch 27, and a stop member 33 used to record or play magnetic tape in a cartridge 4 are also illustrated in their conventional relative positions in the drawing.

The operation of the apparatus will now be described. When the cartridge is not yet inserted into the cartridge receiving chamber of the magnetic tape recorder/reproducer, the movable member 5 is in the position shown in FIGS. 1(a) and 1(b). Thus, the roller 9 extends through the opening in the side wall 2 into the cartridge receiving chamber. In this position, the extension 10 does not extend into either of the holes 21 or 22 and the function control lever 11 can be moved to either of its record or reproduce positions.

Figure 2A:
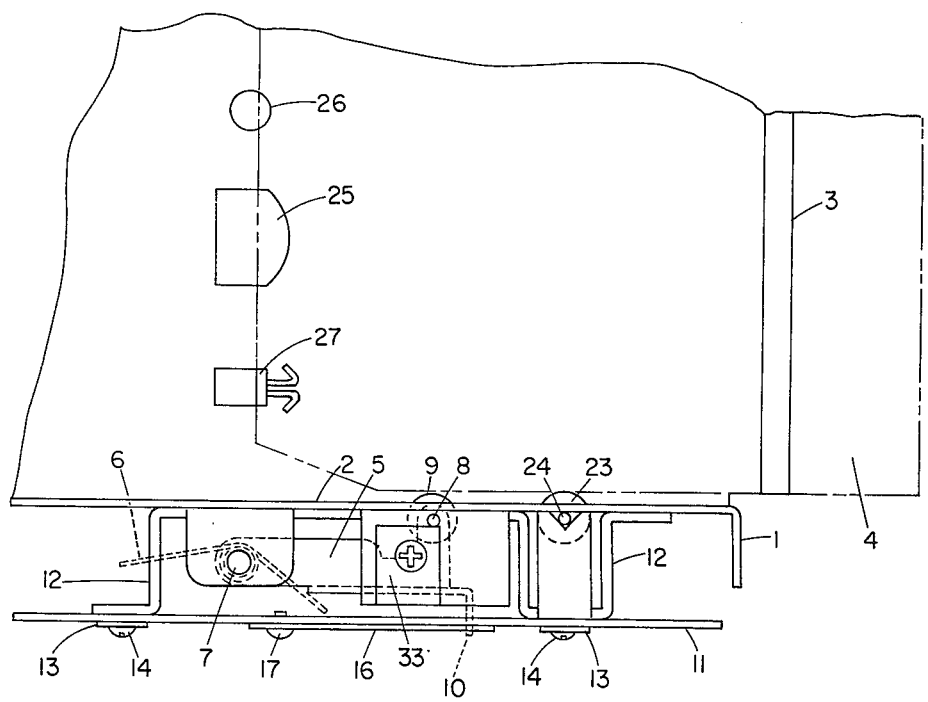
FIGS. 2(a) and 2(b) are a plan view and an elevational view, respectively, of the embodiment of FIGS. 1(a) and 1(b) in a reproducing state with a cartridge fully inserted.
Figure 2B:
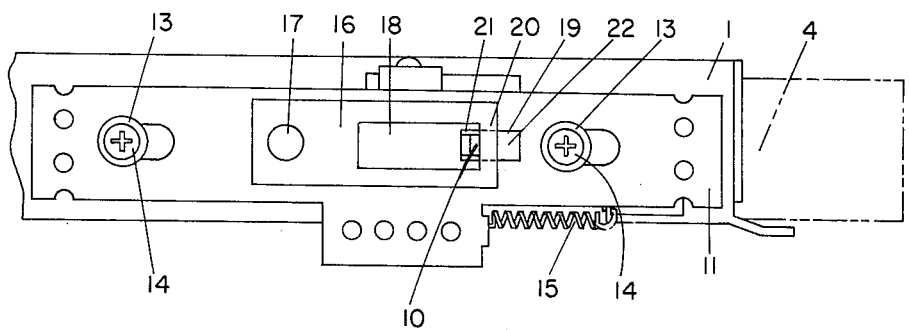

When a cartridge 4 is inserted into the cartridge receiving chamber, the guide roller 23 abuts against a side of the cartridge 4. As the cartridge 4 is further advanced to the left as viewed in FIG. 1(a), the roller 9 is engaged by the sloping surface formed at the forward end of the cartridge 4 and is pushed out of the cartridge receiving chamber. Thus, when the cartridge 4 is inserted completely, the roller 9 abuts against the side surface of the cartridge as shown in FIGS. 2(a) and 2(b), and the cartridge 4 is held firmly at this position (by means not shown). In this state, the movable lever member 5 has been rotated clockwise around the pin 7 forcing the extension 10 into the first part 21 of the hole 19.

The side surface of the extension 10 is now urged against the inner edge of the edge portion 20 of the resilient spring lever 16. This locks the function control lever 11 in this position, and it cannot be moved so long as the cartridge 4 remains in place. Even if the control lever 11 is erroneously depressed by an operator leftwardly, as viewed in FIG. 2(b), there is no possibility that it can be displaced to the second or recording position; because the control lever 11 is prevented from moving to the left by engagement of the extension 10 with the inner side of the edge 20 of the spring lever 16.

Figure 3A:
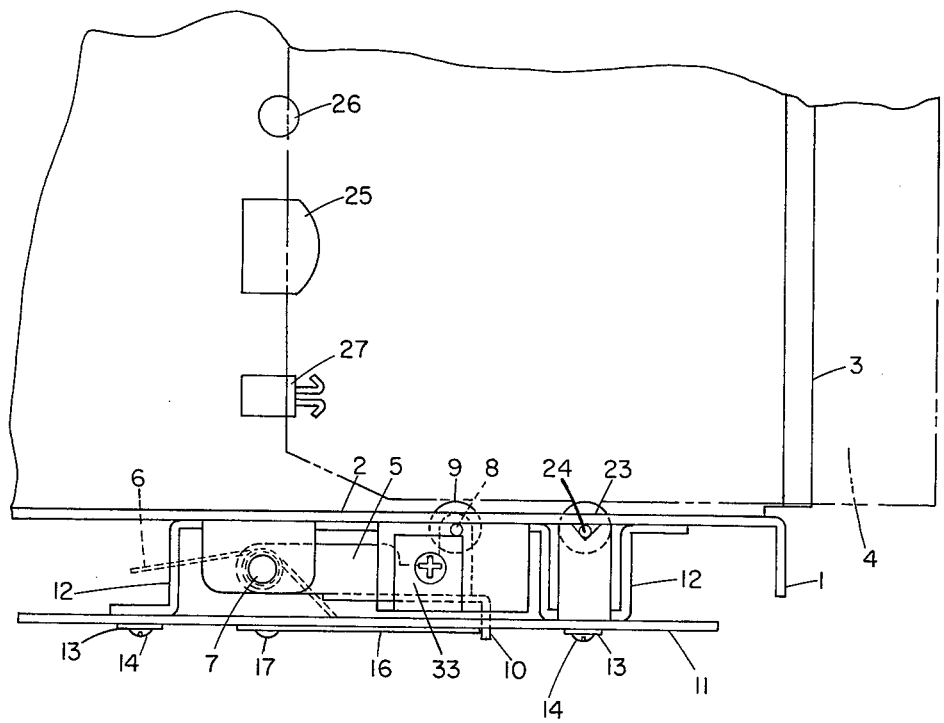
FIGS. 3(a) and 3(b) are a plan view and an elevational view, respectively, of the embodiment of FIGS. 1(a) and 1(b) in a recording state with a cartridge fully inserted.
Figure 3B:
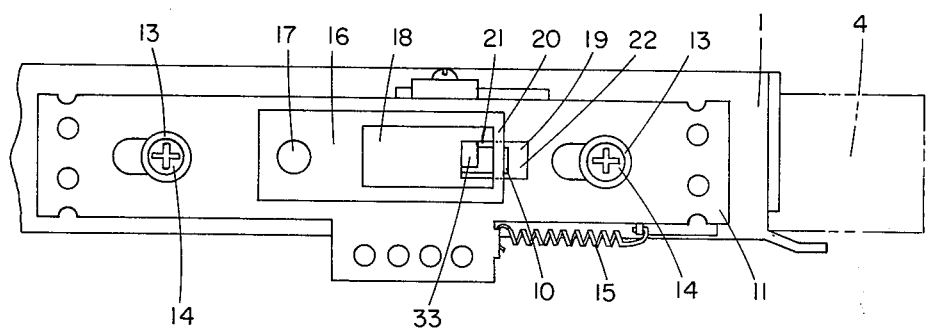

In FIGS. 3(a) and 3(b), the control lever 11 and the related members are shown in their second or recording position. This operational state is realized by depressing the control lever 11 leftwardly as viewed in FIGS. 3(a) and 3(b) before the cartridge 4 is inserted into the cartridge receiving chamber. When a cartridge then is subsequently inserted, the extension 10 is inserted into the second hole portion 22 of the hole 19 on the opposite side of the edge 20 of the spring lever 16. As a result, the control lever 11 is prevented from returning to the right to the first or reproducing position even after the leftward depressing force is released, and the lever 11 is firmly locked to its second or recording position.

Figure 4A:
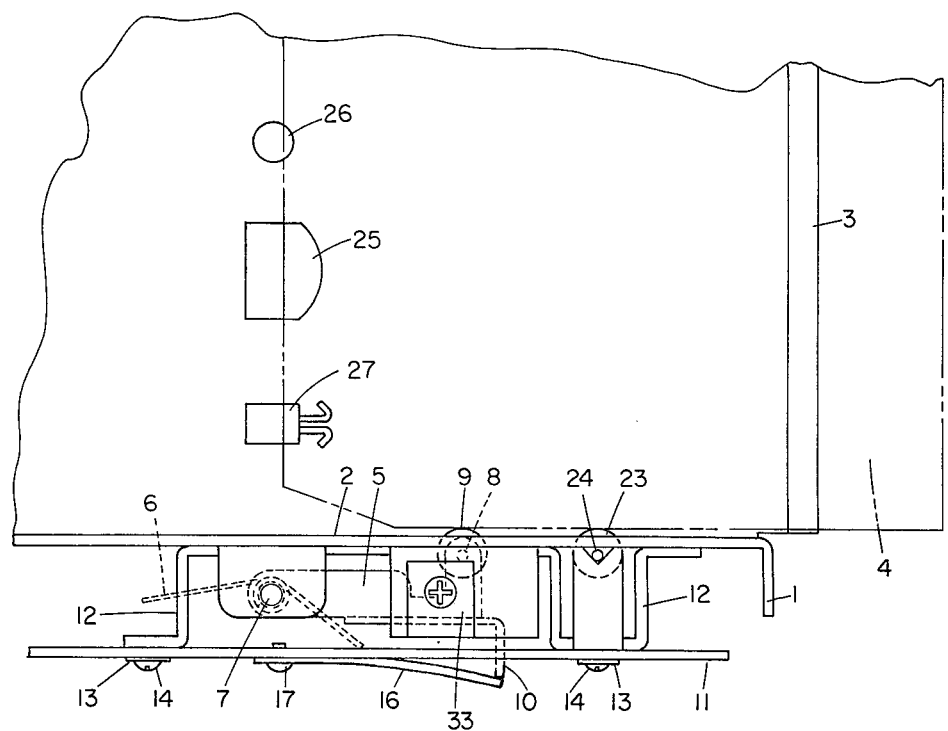
FIGS. 4(a) and 4(b) are a plan view and an elevational view, respectively, of the embodiment of FIGS. 1(a) and 1(b) with a cartridge fully inserted and with the control lever incompletely moved to a point between the positions of FIGS. 2 and 3.
Figure 4B:
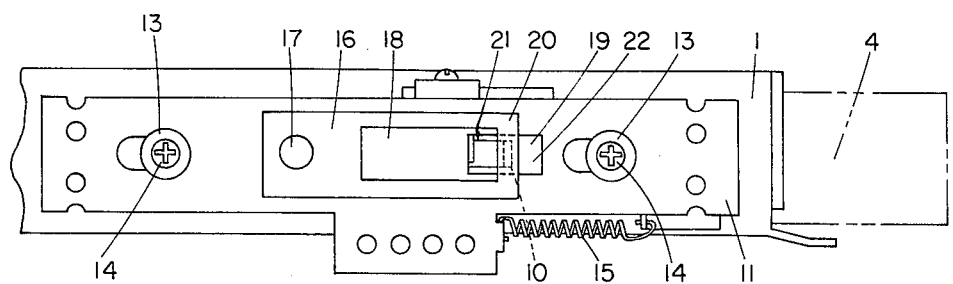
Figure 5A:
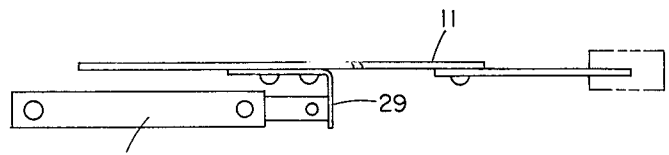
FIGS. 5(a) and 5(b) are a plan view and an elevational view, respectively, showing a recording/reproducing transfer switch connected to the control lever.
Figure 5B:
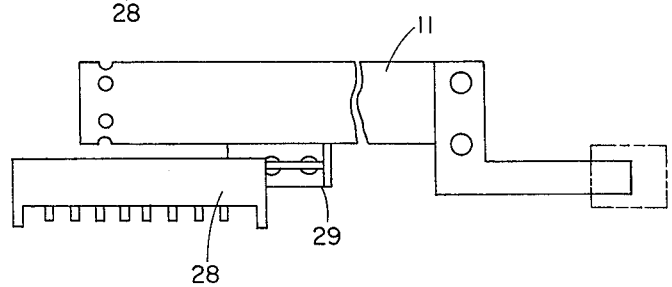
Figure 6A:
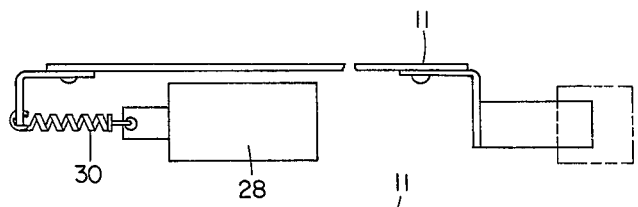
FIGS. 6(a) and 6(b) are a plan view and an elevational view, respectively, showing another example of connecting a recording/reproducing transfer switch to the control lever.
Figure 6B:
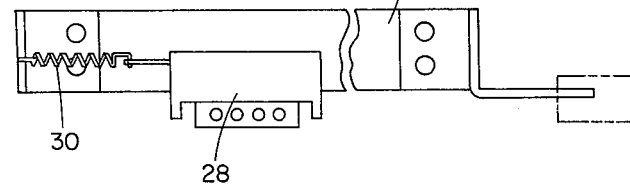

If the control lever is only partially depressed to the left when the cartridge 4 is inserted, the free end of the extension 10 pushes outwardly against the edge portion 20 of the resilient spring lever 16 as shown in FIGS. 4(a) and 4(b), bending the resilient lever 16 outwardly. Then, if the control lever 11 is further depressed leftwardly against the spring force of the coil spring 15, the operation of the tape recorder/reproducer is set and locked to the second recording states as shown in FIGS. 3(a) and 3(b). If on the other hand, depressing force for the control lever 11 is released, the control lever 11 is automatically set and locked into its first reproducing position under the action of the coil spring 15. Thus, it is apparent that the provision of the spring lever 16 allows substantial flexibility to the operation of the locking mechanism which is disclosed.

Two examples of possible connections between the function control lever 11 and a recording/reproducing transfer switch 28 are indicated in FIGS. 5(a) and 5(b) and FIGS. 6(a) and 6(b), respectively. In these examples, a planar spring 29 (FIG. 5) or a coil spring 30 (FIG. 6) are interposed, respectively, between the control lever 11 and the transfer switch 28. These springs compensate for and accommodate possible errors in the mounting positions of the transfer switch 28 relative to the function control lever 11.

Figure 7A:
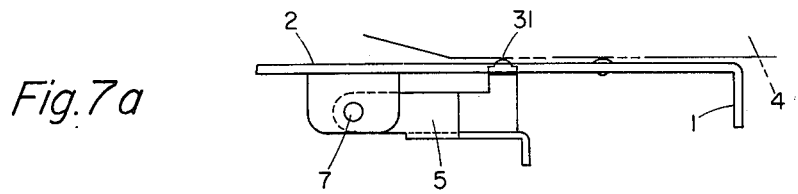
FIGS. 7(a) and 7(b) illustrate modifications of a portion of the apparatus of FIGS. 1, 2, 3 and 4.
Figure 7B:
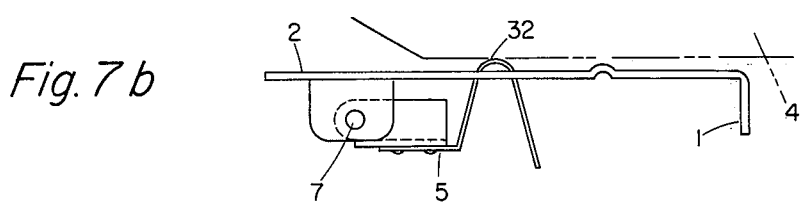

Furthermore, the movable member 5 is not necessarily restricted to the above described construction, but it can be modified in various ways. For example, the roller 23 may be omitted and replaced by a semispherical spacer 31, or a mere bent portion 32 of a one-piece planar spring may be used to replace the functions of both the roller 9 and serve as the extension 10 as shown in FIGS. 7(a) and 7(b), respectively.

A versatile locking mechanism for the function control lever in a magnetic cartridge tape recorder/reproducer is provided in a simple and economical construction. The mechanism prevents erroneous accidental changes of function whenever a cartridge is in its record/reproduce position.

I claim:

1. A locking mechanism for a function control lever used in a magnetic tape recording/reproducing apparatus having a chassis with a cartridge receiving chamber adapted to receive a tape cartridge upon insertion of the cartridge therein, wherein the function control lever is operable in at least a first reproducing position and a second recording position, the locking mechanism including in combination:

at least first and second engageable portions on said function control lever corresponding to said first and second positions thereof, respectively;

a movable member mounted on said chassis adjacent the cartridge receiving chamber and including a cartridge engaging portion mounted thereon, said movable member being movable between a first position wherein said cartridge engaging portion is positioned inside the cartridge receiving chamber and a second position wherein said cartridge engaging portion is in engagement with a cartridge inserted in the cartridge receiving chamber and is substantially outside such chamber;

spring means on said chassis coupled with said movable member to bias said movable member from said second position to said first position; and a control lever engaging portion mounted on said movable lever for movement therewith for engagement with whichever one of said first and second engageable portions of said function control lever is aligned therewith when said movable member is in said second position, whereby said function control lever is locked into whichever of said first and second positions it was in at the time said movable member moved from said first position to said second position, engaging portion being out of engagement with the engageable portions of said function control lever with said movable member in said first position.

2. The combination according to claim 1 wherein said function control lever is slidably mounted on said chassis for movement along the side of the cartridge receiving chamber in directions corresponding to the direction of insertion and removal of a cartridge, said engageable portions of said function control lever comprise first and second openings therethrough, and said control lever engaging portion comprises an extension on said movable member which is moved into whichever one of said first and second openings is aligned therewith when said movable member is moved from said first position to said second position, thereby locking said function control lever against further movement so long as said movable member is in said second position.

3. The combination according to claim 2 wherein said first and second openings are formed from a single opening through said function control lever which is divided into said first and second openings by a further resilient spring means extending across said single opening on the side of said function control lever opposite said cartridge receiving chamber, said further spring means being resiliently pushed away from the surface of said function control lever when said extension on said movable member is moved into engagement therewith.

4. The combination according to claim 1 wherein the cartridge engaging portion of said movable member comprises a roller rotatably mounted on said movable member for engagement by the cartridge upon its insertion into the cartridge receiving chamber.

5. The combination according to claim 1 wherein said movable member, cartridge engaging portion, and control lever engaging portion are formed from a single piece of spring material resiliently biased into the cartridge receiving chamber for engagement and displacement from said first position to said second position by a cartridge upon its insertion into the cartridge receiving chamber.

* * * * *